W. & M. H. PATERSON.
AUTOMOBILE TRACTOR.
APPLICATION FILED AUG. 15, 1917.

1,269,113.

Patented June 11, 1918.

WITNESSES:

INVENTORS
William Paterson
May H. Paterson

UNITED STATES PATENT OFFICE.

WILLIAM PATERSON AND MAY H. PATERSON, OF OAKLAND, CALIFORNIA.

AUTOMOBILE-TRACTOR.

1,269,113.     Specification of Letters Patent.     Patented June 11, 1918.

Application filed August 15, 1917. Serial No. 186,414.

*To all whom it may concern:*

Be it known that we, WILLIAM PATERSON and MAY H. PATERSON, citizens of the United States, residing at Oakland, in the county of Alameda and State of California, have invented a new and useful Automobile-Tractor.

Our invention relates to improvements in automobile tractors. It consists of a pair of tractor wheels, mounted upon the outer ends of an axle, so as to turn loosely thereon, said axle supports two transverse parallel arms, which form a supplemental chassis made to correspond to and underlie the longitudinal chassis of an automobile; said arms are provided with pillow blocks, near their rear ends, adapted to receive the outer ends of the tubes that incase the rear driving axles of an automobile, the rear wheels of the car being raised clear of the ground, the front wheels of the car being allowed to rest on the ground, to be used to steer the vehicle; a small chain sprocket is fixed to the inside or outside of the hubs or axles of each of the driving wheels of the car (which may remain thus attached while the car is used as a runabout), a larger chain sprocket having a pinion united to its hub, is mounted upon and keyed to one end of a counter-shaft, which is journaled parallel to the driving axle of the automobile upon the said supplemental chassis, a similar chain sprocket having a united pinion on one side of its hub and a united sleeve and a clutch on the other side of its hub, is mounted loosely upon the other end of said counter-shaft, each of said larger chain sprockets are in alinement with each of the small chain sprockets which are secured to the hubs of the driving wheels of the car, and a chain transmits rotary motion to the sprockets having the united pinions; said pinions engage with the teeth of internal spur gear secured to the inner side of traction wheel tires; a clutch is slidably mounted upon said counter-shaft, adapted to engage the clutch on the united sleeve, and can be shipped to lock the differential when necessary the action and purpose of which is hereinafter more fully described, reference being had to the accompanying drawing in which—

Figure 3:
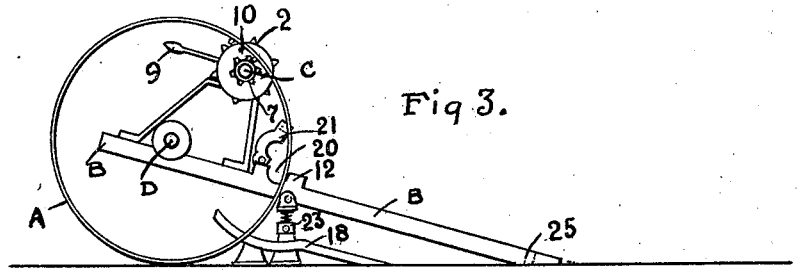
Fig. 3 is a side view of the supplemental chassis, with incline plane in place.
Figure 2:
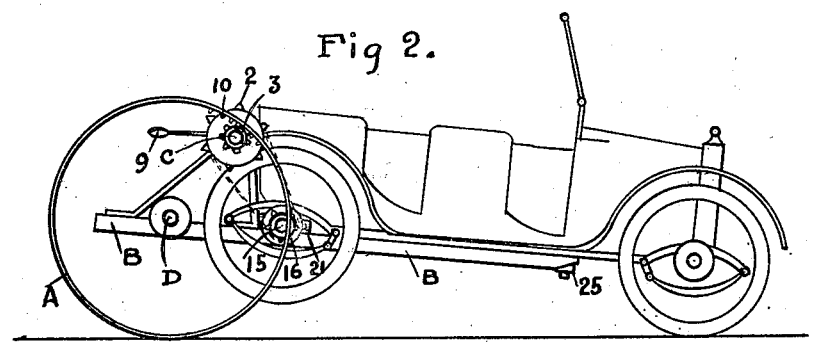
Fig. 2 is a side elevation of the same, with body intact.
Figure 1:
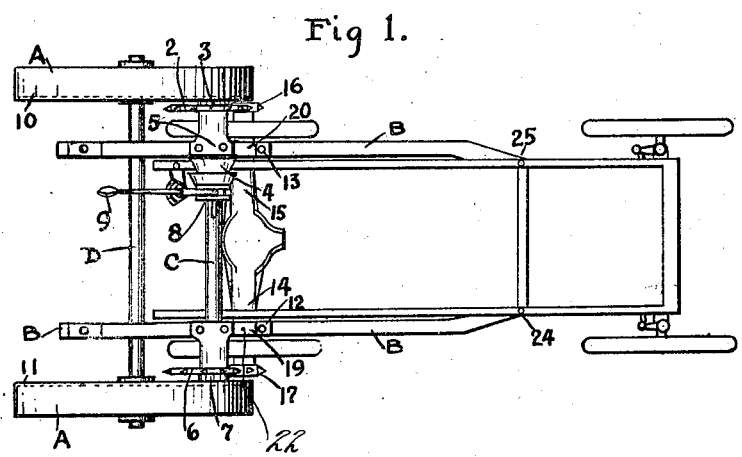
Figure 1 is a top view of the auto, with body removed, mounted upon the supplemental chassis.

The objects of our improvement is to utilize all the functions of the automobile in propelling and steering a slow traveling tractor, particularly adapted to plowing, cultivating and slow hauling, without unduly impairing the fragile mechanism of an automobile or motor truck. A further object is to easily and quickly attach or detach an entire automobile or motor truck from the supplemental chassis.

In the drawing A A represents the traction wheels, B B the supplemental running gear or chassis, D the axle, C the counter-shaft having the chain sprocket 2, and united pinion 3, on one side of its hub, and a projecting sleeve and clutch 4 on its other side, extending through and revolving in journal box 5, said united sprocket pinion sleeve and clutch turn freely on one end of counter-shaft C, the chain sprocket 6, and united pinion 7 are keyed to the other end of counter-shaft C, the slidable clutch 8 having a longitudinal key-seat adapted to slide along a feathering key which is inserted in and mounted upon counter-shaft C engages with clutch 4 thus locking the differential, and can be disengaged by shipping lever 9; the united pinion 3, mounted upon one end of counter-shaft C, meshes with the teeth of internal spur gear 10, which is secured to the inside of the tire of traction wheel A; the united pinion 7, mounted upon the other end of counter-shaft C, meshes with the teeth of internal spur gear 11, which is secured to the inside of the tire of traction wheel A; the pillow blocks 12 and 13 are adapted to receive and clamp the tubes 14 and 15 of the driving axles of the automobile to the supplemental chassis B B; the small chain sprockets 16 and 17 that are secured to the inside or outside of the hubs or axles of the driving wheels of the automobile, transmit through the medium of a chain, rotary motion to the chain sprockets 2 and 6, which are mounted on the counter-shaft C; the inclined plane 18 forms a rail for the tires of the auto to climb, in backing the auto, so that the tubes 14 and 15 will register with the cavities 19 and 20, on pillow blocks 12 and 13; the clamps 21 and 22 secure the tubes 14 and 15 to the pillow blocks 12 and 13 on supplemental chassis B B; a jack-screw 23, or other means, raises the supplemental chassis B B flush with and secured to the chassis of the automobile at 24 and 25, thus raising the rear wheels of the automobile clear of the ground, free to revolve at their normal speed when the tractor is in action.

What we claim as new and desire to secure by Letters Patent is:

In a device of the class described, a tractor frame, tractor wheels supporting the same, means transferring the drive from an automobile partly supported on said frame to said traction wheels, an integral counter shaft journaled parallel to driving axle of said automobile, upon said frame, a chain sprocket and united pinion keyed to one end of said counter shaft, a chain sprocket with united pinion on one side of its hub, a sleeve and clutch united to the other side of its hub mounted turnably upon the other end of said counter shaft, said sleeve adapted to revolve around said counter shaft within a journal box, a slidable clutch having a keyseat adapted to slide on a feathering key fixed on said counter shaft, a shipping lever adapted to slide said clutch into engagement with corresponding jaws of clutch on said sleeve, said pinions mounted on and projecting from each end of said counter shaft, meshing with internal spur gear secured within the tire of each traction wheel, the chain sprockets which are united to said pinions being in alinement with the sprockets on the drive wheels of the automobile, as shown and described and for the purposes set forth in the foregoing specification.

WILLIAM PATERSON.
MAY H. PATERSON.

Witnesses:
JAS. S. NAISMITH.
JAS. S. NAISMITH.